Jan. 8, 1935.　　G. D. SUNDSTRAND　　1,987,450
CONTROL MECHANISM FOR MACHINE TOOLS
Filed Nov. 9, 1931　　5 Sheets-Sheet 1
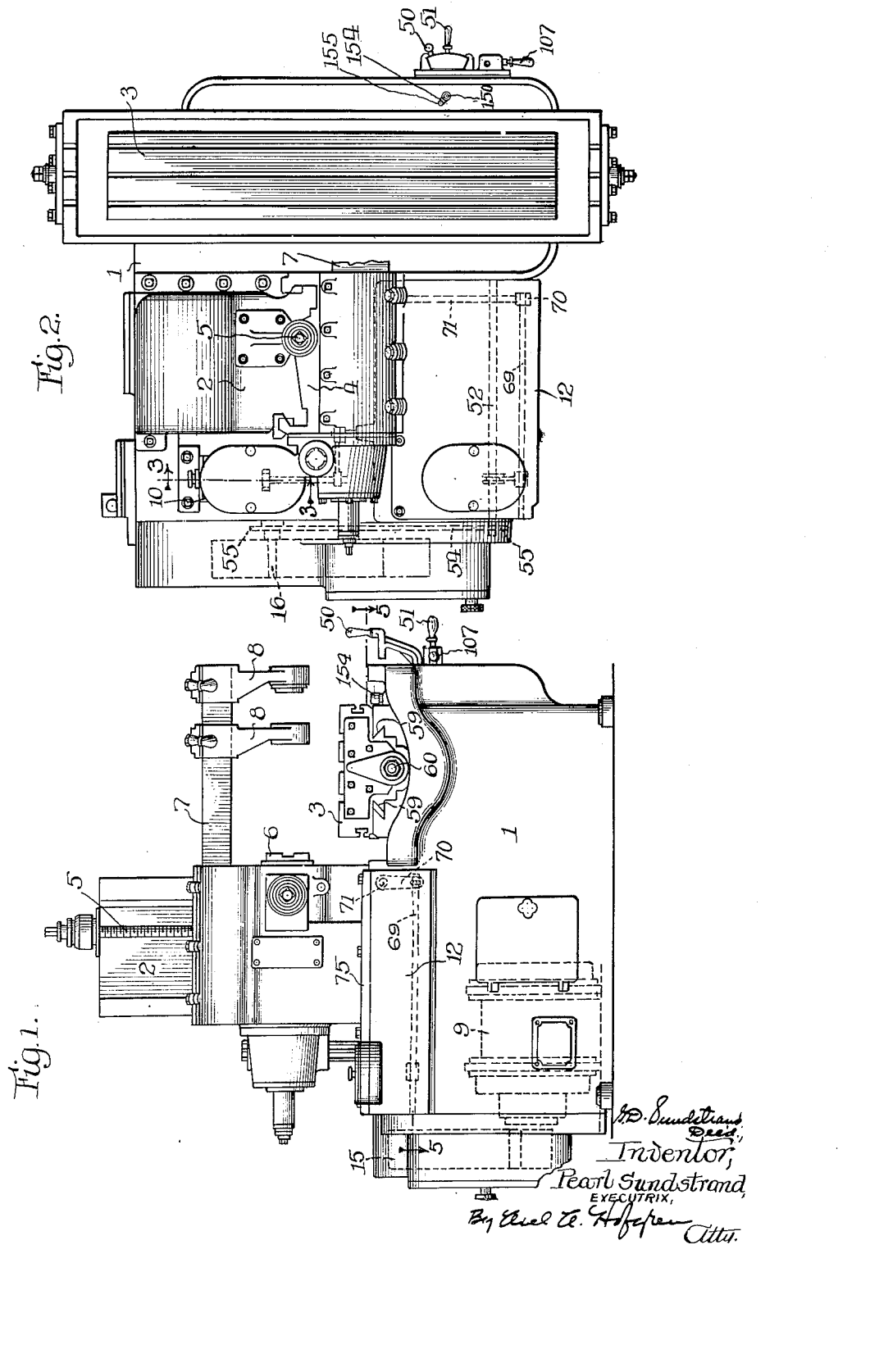

Jan. 8, 1935.  G. D. SUNDSTRAND  1,987,450
CONTROL MECHANISM FOR MACHINE TOOLS
Filed Nov. 9, 1931   5 Sheets-Sheet 2

Jan. 8, 1935.  G. D. SUNDSTRAND  1,987,450
CONTROL MECHANISM FOR MACHINE TOOLS
Filed Nov. 9, 1931  5 Sheets-Sheet 3
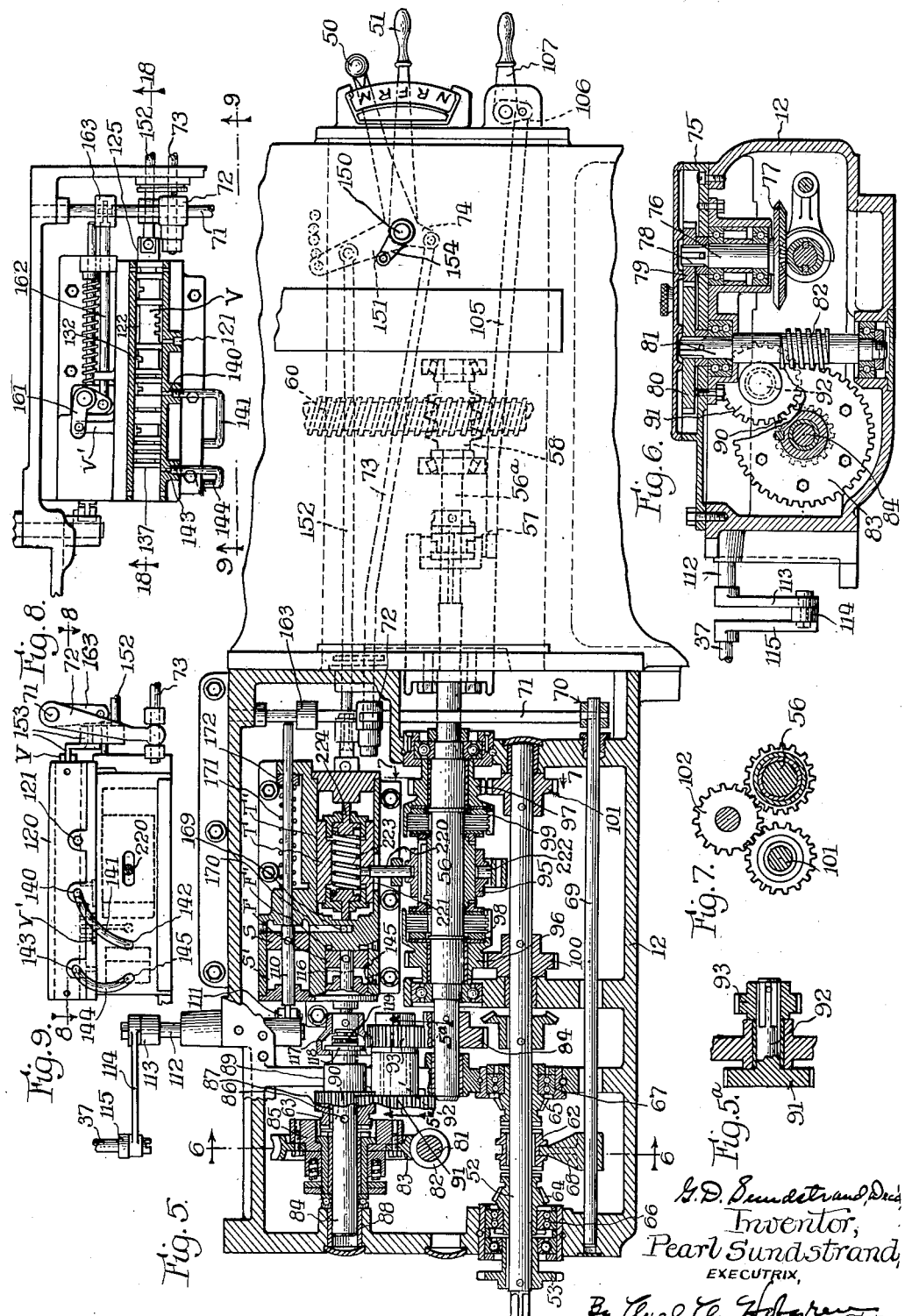

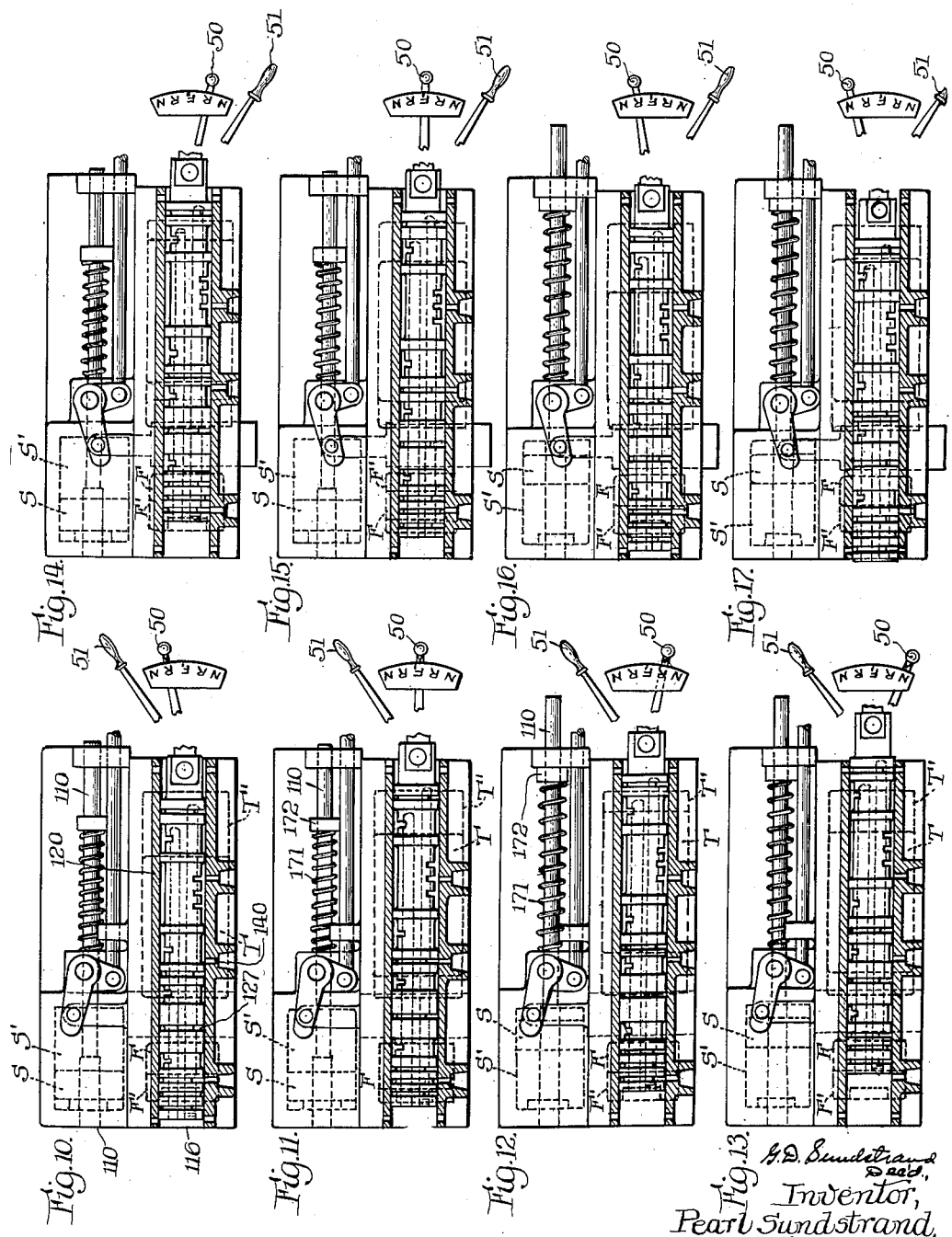

Jan. 8, 1935.  G. D. SUNDSTRAND  1,987,450
CONTROL MECHANISM FOR MACHINE TOOLS
Filed Nov. 9, 1931  5 Sheets-Sheet 5
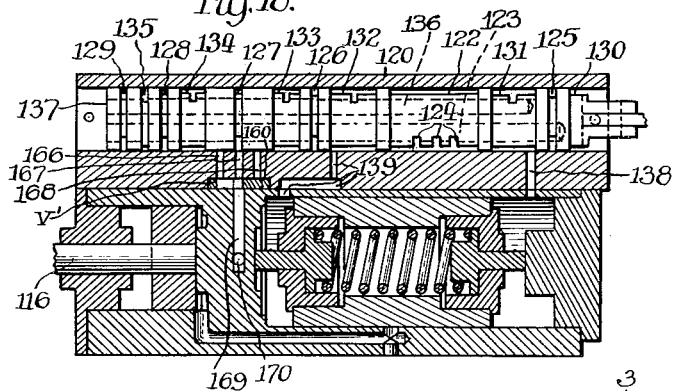
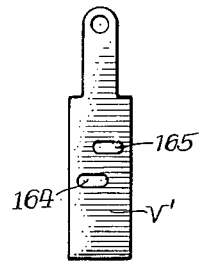

Patented Jan. 8, 1935

1,987,450

UNITED STATES PATENT OFFICE 1,987,450

CONTROL MECHANISM FOR MACHINE TOOLS

Gustaf David Sundstrand, deceased, late of Rockford, Ill., by Pearl Sundstrand, executrix, Rockford, Ill., assignor to Sundstrand Machine Tool Co., Rockford, Ill., a corporation of Illinois Application November 9, 1931, Serial No. 573,926

16 Claims. (Cl. 90—21)

More particularly the invention relates to a new and improved mechanism for actuating and controlling the movements of tool and work supports of machine tools.

The general object of the invention is to provide an improved machine tool embodying a novel mechanism for actuating and controlling the work and tool supports, arranged to permit the machine to be operated at maximum efficiency and at high speeds with a minimum of wear and tear.

Another object is to provide a new and improved automatic means for controlling the starting and stopping of the tool supporting member of the machine.

Another object is to provide an improved controlling mechanism for the work and tool supports of a milling machine, whereby it is possible to move the work support at traverse and feed rates in both directions and thereby enable the machine to be set up for "automatic milling" with either forward or reverse feed, "intermittent milling" in both directions, and "continuous milling", and at the same time control the starting and stopping of the tool support.

A further object is to provide an improved control mechanism for the work and tool supports of a milling machine adapted for such cycles of operation and arranged to start the tool spindle when the work support begins its movement toward the cutter, and for stopping the tool spindle at the end of the cutting operation.

Yet a further object is to provide a control mechanism for the spindle and work support of a machine tool which is novel and improved over that disclosed in the application of Gustaf David Sundstrand, Serial No. 438,008 filed March 22, 1930, in which a control mechanism for the spindle and work support, having features common to the present application, is disclosed and broadly claimed.

Further objects and advantages will become apparent from the following detailed description taken in connection with the accompanying drawings, in which:

Fig. 1 is a side elevation of a milling machine embodying the preferred form of the invention.

Fig. 2 is a plan view thereof.

Fig. 5 is a horizontal view partly in section along the line 5—5 of Fig. 1, showing the feeding mechanism for the table.

Fig. 5a is a fragmentary section along the line 5a—5a of Fig. 5.

Fig. 6 is a fragmentary section along the line 6—6 of Fig. 5.

Fig. 7 is a fragmentary section along the line 7—7 of Fig. 5.

Fig. 8 is a horizontal section through the main valve mechanism approximately along the line 8—8 of Fig. 9.

Fig. 9 is a fragmentary elevational view along the line 9—9 of Fig. 8.

Figs. 10 to 17 are fragmentary plan views partly in section along the line 8—8 of Fig. 9, on an enlarged scale and with the control handles illustrated somewhat diagrammatically, showing the positions of the pistons for the differing positions of the valves.

Fig. 18 is an enlarged longitudinal vertical section through the main valve, substantially along the line 18—18 of Fig. 8.

Fig. 19 is an enlarged detail view of the auxiliary valve.

Fig. 20 is an enlarged fragmentary view somewhat diagrammatic in character of the trip device and different types of dogs.

Fig. 21 is a sectional view substantially along the line 21—21 of Fig. 20.

Figs. 22 to 26 are diagrammatic views illustrating different set ups of dogs for various types of milling cycles.

Figure 3:
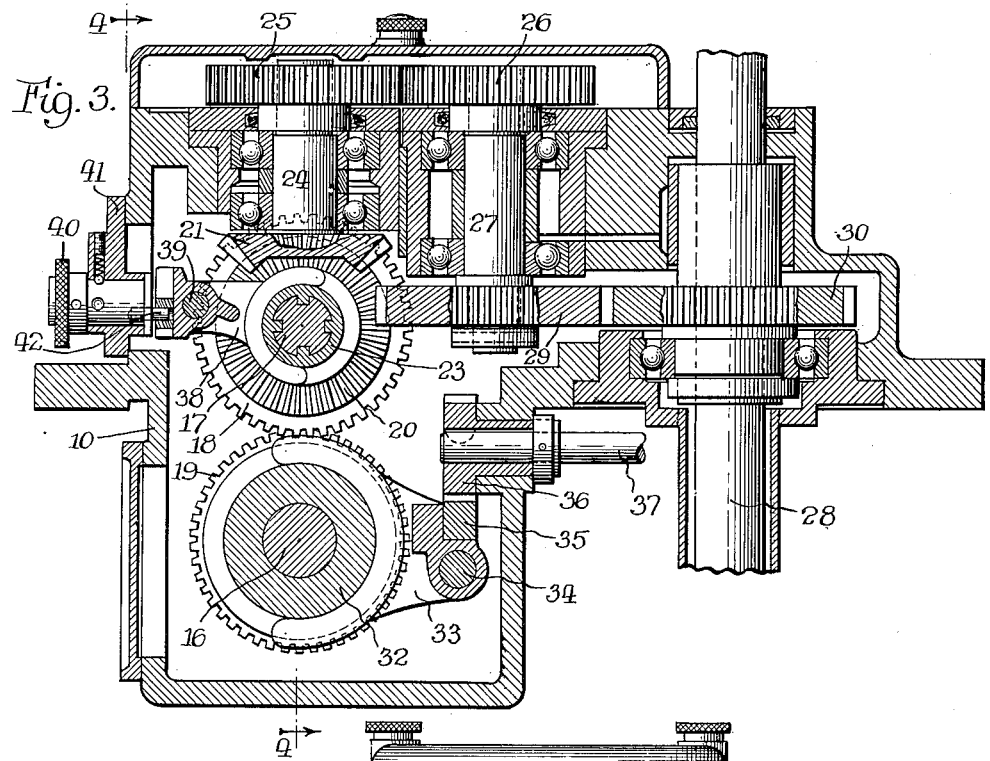
Fig. 3 is a vertical section substantially along the line 3—3 of Fig. 2, showing a portion of the spindle drive mechanism.

In machine tools, as, for example, milling machines, it is often desirable not only to control the movements of the work support or table for obtaining various automatic cycles of operation, but in order to operate the machine efficiently it is of particular advantage to control the operation of the tool support or spindle in certain timed relation to the movements of the table. Thus, for example, if the machine is arranged for "automatic milling" wherein the table is first advanced rapidly at a non-cutting or traverse rate in order to bring the work up to the cutter, is then fed at a relatively slow or feed rate while the cutter is operating upon the work piece, and is then returned automatically at a rapid traverse rate to its starting position, it is desirable to stop the cutter spindle at the end of the cutting operation so as to prevent the cutter from marring the work during the return movement of the table. Whether such an "automatic milling" cycle is instituted manually each time or repeats itself automatically, it is desirable to start the cutter spindle at the beginning of or during the advance movement of the table prior to the engagement of the cutter with the work.

Although particular mention has just been made with regard to an "automatic milling" cycle, the invention in its preferred form is particularly adapted for controlling the work and tool supports of the machine when operating on more complicated cycles. Thus, when a machine is set up for "intermittent milling", wherein the work support is first advanced rapidly at a traverse rate to bring the work into operative relation with the cutter, is then moved at a slow or feed rate during a cutting operation, is then advanced rapidly again to bring the next work piece into operative relation with the cutter or to bring another portion of the same work piece into operative relation with the cutter, and is then moved again at a feed rate during a second cutting operation, the controlling mechanism, as disclosed herein, is arranged to start the spindle when the table is first moved toward the cutter, and permits the cutter to continue in operation during the entire forward stroke of the table irrespective of whether the table is moving at a traverse or at a feed rate.

A "continuous milling" cycle is generally used when it is desired to perform cutting operations at each end of the reciprocatory movement of the table, thus enabling an operator to replace a finished work piece at one end of the table while the cutter is operating on another work piece positioned at the other end of the table. For such a cycle it is necessary to reverse the direction of feed so that the cycle may be said to comprise (1) rapid approach, (2) forward feed, (3) rapid return, and (4) return feed, after which the cycle is repeated. This cycle may be accomplished entirely automatically although for certain classes of work it is desirable to stop the table prior to the engagement of the cutter with the work, in each direction, and require the operator to start the table manually.

As disclosed herein the preferred form of the invention is embodied in a milling machine which, as illustrated in Figs. 1 and 2, comprises generally a bed or base 1 having a column 2 rising from one rear corner thereof and a horizontal work support or table 3 slidably mounted for movement transversely in front of said column. A saddle or head 4 is slidably mounted on the column 2 and is adapted to be adjusted vertically by means including a manually operable feed screw 5. This head has a tool or cutter spindle 6 rotatably mounted thereon and supports an overarm 7 which at its outer end may be provided with one or more outboard bearing supports 8 for the outer end of the cutter arbor (not shown). The tool spindle 6 is arranged to be driven from a motor 9 by means of suitable gearing (Figs. 3 and 4) located principally in a casing 10 which embodies a disconnecting or spindle clutch 11. The table is actuated by power derived from the motor 9 through intermediate gearing which includes speed and direction changing gearing contained in a feed box 12 positioned on the rear of the base 1 to one side of the column 2, as hereinafter more fully described. It is to the driving mechanism for the tool and work supports and the means for controlling this mechanism that the present invention is more particularly directed.

The casing 10 (Figs. 2, 3 and 4) is mounted in the base 1 of the machine in a position such that a main drive pulley 15 mounted on a shaft 16 in the casing, is adapted to be belted to the pulley of the motor 9. The exemplary form of gearing to the spindle comprises (Figs. 3 and 4) a shaft 17 positioned above and parallel to the shaft 16, gears 18 and 19 connecting the shaft 17 with one element of the clutch 11, bevel gears 20, 21 and 22 comprising a reversing clutch for the spindle having an actuating element 23 keyed to the shaft 17, a short vertical shaft 24 carrying the bevel gear 21 and pick-off gears 25 and 26 connected one to the vertical shaft 24 and the other to a parallel vertical shaft 27. A vertical drive shaft 28 which extends upwardly to drive the spindle 6 is driven from the shaft 27 by means of a pair of gears 29 and 30. A cutter coolant pump (not shown) may be driven from the shaft 17 by means of a sprocket 31 (Fig. 4) so as to be started and stopped with the spindle 6.

The spindle disconnecting clutch 11 is arranged to be actuated by means of a clutch element 32 operable by means of a yoke 33 which is slidably mounted on a rod 34. The yoke 33, as illustrated herein, is provided with a rack 35 with which a pinion 36 meshes. This pinion is mounted on a shaft 37 and, as described more fully hereinafter, is arranged to be operated automatically by the control means for the work support. The clutch element 23 of the spindle reversing clutch is arranged to be operated manually by means of a yoke 38 slidably mounted on a rod 39. A knurled knob 40 rotatably mounted on a plate 41 secured to the side wall of the casing 10 carries an eccentric pin 42 on the inner end thereof engaging a vertical slot in the yoke 38. This permits the clutch element 23 to be shifted into engagement with either the gear 20 or the gear 22.

In the exemplary form of the invention, movement of the table 3 is accomplished by mechanical means driven from the motor 9 and is controlled by hydraulically operated mechanism which may be operated manually by means of control handles 50 and 51 positioned at the front of the machine or by means of an automatic trip mechanism actuated by dogs carried on the front edge of the table. The mechanical mechanism is positioned principally within the feed box 12 and comprises generally means for feeding the table in opposite directions at a slow rate, suitable for cutting operations, or for traversing the table in opposite directions at a rapid rate, suitable for advancing and returning the table when no cutting is taking place.

This mechanism, in the form illustrated herein, includes a drive shaft 52 (Fig. 5) which is rotatably mounted within the feed box 12 and extends forwardly from the rear of the machine. The shaft is adapted to be driven positively from the motor 9 by means which is independent of the spindle clutch 11 and includes a sprocket 53 secured to the rear end of the shaft and a chain 54 (Fig. 2) connecting said sprocket with a drive sprocket 55 on the shaft 16. The power is transmitted from shaft 52 to the table by means of clutches and gearing within the feed box including a shaft 56 (Figs. 5 and 7) which extends parallel to the shaft 52 and out through the forward end wall of the feed box. At its forward end this shaft is coupled by means of a clutch 57 to a worm 58 (Fig. 5) which is mounted on a shaft 56ª rotatably mounted on the base 1 beneath the table 3. The table, as mentioned hereinbefore, is slidably mounted on the bed, being guided for movement thereon by means of ways 59, and carries a non-rotatable feed screw 60. The worm 58 meshes with a worm wheel 61 which is rotatably mounted on the base 1 and is provided with an interior thread acting as a nut for the feed screw. The feed shaft 56 is arranged to be driven at slow speeds for feeding the table or at a rapid speed for traversing the table.

The means for driving the shaft 56 at slow rates of speed for feeding the table, as illustrated most clearly in Figs. 5 and 6, includes a reversing feed clutch 62 and a disconnecting feed clutch 63. The reversing clutch is adapted to be engaged with either of a pair of oppositely positioned bevel gears 64 and 65 rotatably mounted within the feed box by means of ball bearings 66 and 67 and having central bores through which the drive shaft 52 passes. These gears and the element 62 which is positioned intermediate the adjacent ends of the gears, are provided with clutch teeth. The clutch is arranged to be shifted manually by means of a yoke 68 mounted on a rod 69 extending forwardly through the feed box. At its forward end this rod is connected to the free end of an arm 70 secured to a transversely extending shaft 71. The other end of the shaft carries an arm 72 connected by means of a link 73 to a short arm 74 on the control handle 51 which is pivotally mounted on the bed adjacent the front of the machine.

As shown in Fig. 6, a cover 75 on the feed box supports a short vertical shaft 76 which carries a bevel gear 77 on its lower end meshing with the gears 64 and 65. Thus depending upon which way the clutch element 62 is shifted, the shaft 76 may be driven in opposite directions, through the gear 64 or the gear 65. The upper end of the shaft 76 is preferably provided with a plurality of splines 78 to drive one gear 79 of a set of pick-off gears. The other gear 80 of this set is similarly mounted on the upper end of a shaft 81 positioned adjacent and parallel to the shaft 76. The shaft 81 is provided with a worm 82 which meshes with a worm wheel 83 rotatably mounted on a horizontally extending shaft 84. The worm wheel has clutch teeth 85 (Fig. 5) on one end thereof which form one element of the feed disconnecting clutch and are arranged to be engaged by the clutch 63 mentioned hereinbefore. The clutch 63 is preferably secured to the shaft 84 by means of a key 86 and a pin 87, the shaft being slidable longitudinally in bearings 88 and 89 as well as being rotatably mounted therein. As shown herein the clutch 63 has gear teeth 90 formed thereon. These engage with an intermediate gear 91 (Figs. 5a and 6) on a short shaft 92 which carries a second gear 93 which in turn drives a gear 94 (Fig. 5) on the rear end of the shaft 56. Thus with the feed reversing clutch 62 engaged with either the gear 64 or the gear 65, the table is moved in the corresponding direction whenever the feed clutch 63 is engaged.

The means for driving the shaft 56 at a traverse speed, as illustrated most clearly in Fig. 5, comprises a reversing traverse clutch having a shiftable element 95. A pair of spur gears 96 and 97 rotatably mounted on the shaft 56 have portions carrying elements of friction type clutches 98 and 99 and are arranged to be driven in opposite directions from the drive shaft 52. The gear 96 is driven directly from the shaft 52 by means of a spur gear 100, whereas the gear 97 is driven in the opposite direction by means of a spur gear 101 on the shaft 52 and an intermediate idler gear 102 (Fig. 7). The other elements of the friction clutches 98 and 99 are carried on the shaft 56 to rotate therewith, clutch 98 being engaged when the element 95 is shifted to the left (Fig. 5) and clutch 99 being engaged when the element 95 is shifted to the right.

In its preferred form, the invention embodies hydraulically operated means for actuating the spindle clutch 11, feed clutch 63 and the traverse reversing clutch 95. As illustrated herein, this means comprises (Fig. 5) a piston S slidably mounted in a cylinder S′ and connected to the spindle clutch 11, a piston F slidably mounted in a cylinder F′ and connected to the feed clutch 63, and a piston T slidably mounted in a cylinder T′ and connected to the traverse reversing clutch 95.

Figure 4:
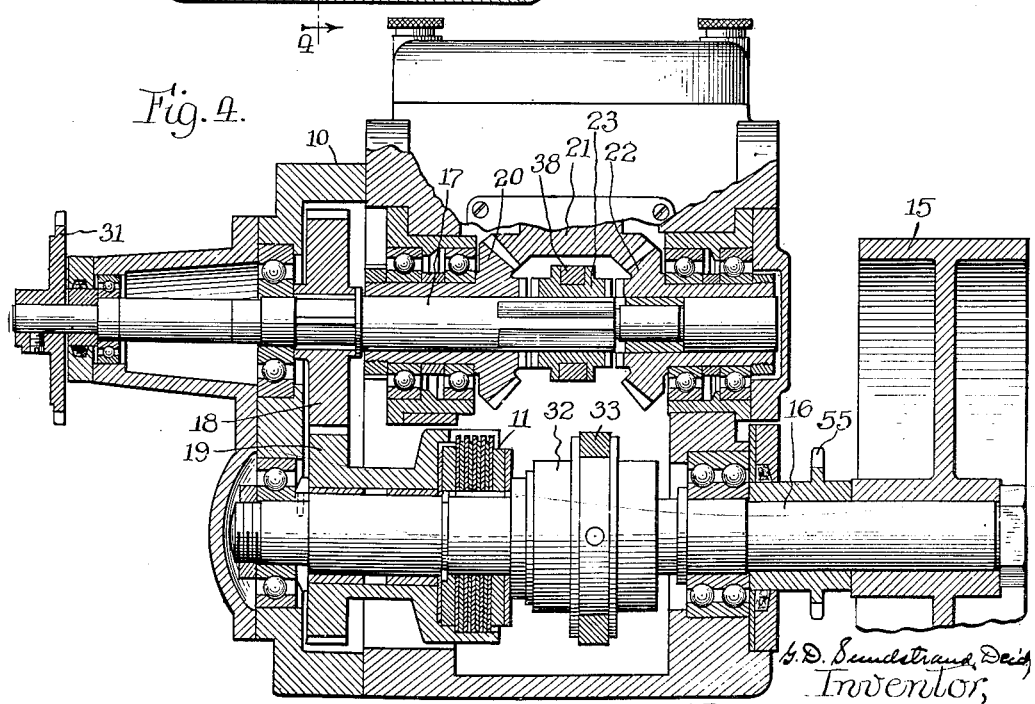
Fig. 4 is a vertical view partly in section along the line 4—4 of Fig. 3.

The spindle piston S (Fig. 5) is connected to the spindle clutch 11 by means of a piston rod 110 connected at its outer end to the lower end of an arm 111 secured to a horizontally extending shaft 112 which is rotatably mounted in the side wall of the feed box 12. This shaft extends through the feed box wall and at its outer end carries a downwardly extending arm 113 which is connected by means of a link 114 to an arm 115 secured to the end of the shaft 37 (Figs. 3, 5 and 6). The feed piston F is connected to the feed clutch 63 by means of a piston rod 116 which carries a flanged collar 117 on its outer end and is connected to the end of the shaft 84 by means of a ring 118 rotatably mounted on said shaft by means of a thrust ball bearing 119. This connection is such that the shaft 84 and clutch element 63 carried thereon may be shifted longitudinally by means of the piston F.

The traverse clutch piston T is in the form of a sleeve which carries a pin 220 extending through a slot 221 in the cylinder T′ and is attached to a yoke 222 engaging the clutch member 95. The traverse piston is normally held in its mid-position by means of a spring 223 positioned within the piston and engaging at its opposite ends with headed plungers 224.

The pistons F, T and S are preferably arranged to be controlled by means of a unitary valve mechanism which is operable manually by means of the control handle 50 or automatically by means of a dog-operated trip device. Auxiliary valve mechanism operable by means of the feed reversing clutch lever 51 is provided so as to enable the unitary valve mechanism to control the spindle clutch automatically during either direction of table feed.

The valve mechanism, as illustrated in Figs. 5, and 8 to 18, comprises a casing 120 having a cylindrical valve V slidable therein. The casing has an inlet port 121 which communicates with a chamber formed by an annular groove 122 in the valve. A longitudinally extending supply passage 123 (Fig. 18) in the valve is arranged to receive pressure fluid from said inlet chamber through cross grooves 124. The valve is provided with narrow annular grooves 125, 126, 127, 128 and 129, each connected to the supply passage 123. The valve V is also provided with peripheral exhaust grooves 130, 131, 132, 133, 134 and 135, each connected by means of cross grooves to a longitudinally extending exhaust passage 136 which is open at the left hand end at 137 so as to discharge into the feed box 12.

The supply groove 125 and exhaust grooves 130 and 131 are arranged to control the inlet and exhaust of pressure fluid to and from the right-hand end of the traverse clutch cylinder T′ which is connected to the valve casing 120 by means of a port 138 (Fig. 18). The supply groove 126 and exhaust grooves 132 and 133 are similarly arranged to control the inlet and exhaust of fluid to and from the left-hand end of the traverse cylinder T′ which is connected to the valve casing 120 by means of a port 139. The supply groove 127 and exhaust grooves 133 and 134 are arranged to control the inlet and exhaust of fluid to and from the right-hand end of the feed clutch cylinder F' which is connected to the casing 120 by means of a port 140, conduit 141 and port 142. Supply grooves 128 and 129 and exhaust groove 135 are arranged to control the supply and exhaust of fluid to and from the left-hand end of the feed clutch cylinder F' which is connected to the casing 120 by means of a port 143 (Figs. 5 and 9) a conduit 144 and a port 145 (Fig. 8).

Cooperating with the main valve V to control the flow of fluid to the right-hand end of the spindle cylinder S' (Figs. 5 and 8 to 19) is an auxiliary valve V'. This valve is in the form of a plate and is slidably mounted in a transverse groove 160 in the under side of the casing 120 for movement from the position shown in Figs. 10 to 13, to the position shown in Figs. 14 to 17. In the exemplary embodiment of the invention, this valve is arranged to be operated by the feed reversing lever 51 and is connected to that lever by means of a bell crank 161, a rod 162 connected at one end to the bell crank, and an arm 163 secured to the shaft 71 and having its free end connected to the other end of the rod 162. The valve V' is preferably in the form illustrated in Fig. 19 and has control ports 164 and 165 therein.

The casing 120 is provided with three vertical ports 166, 167 and 168 (Fig. 18) spaced longitudinally of and communicating at their upper ends with the main valve chamber, and communicating at their lower ends with the auxiliary valve groove 160. A port 169 in alinement with the port 167 extends downwardly from the lower side of the auxiliary valve groove and communicates with a horizontally extending port 170 which is connected at its other end (Fig. 5) with the cylinder S'. Thus if the main valve V is in its feed position as illustrated in Fig. 18, the supply groove 127 communicates with the port 167 and supplies fluid to the cylinder S' through one of the control ports 164 and 165 in the auxiliary valve V' (depending upon the position the valve is in) through the ports 169 and 170. Assuming that the auxiliary valve V' is in the position illustrated in Figs. 10 to 13, in which case the feed reversing clutch 62 is engaged so that, with the main valve in its feed position (Fig. 11), the table 3 would feed upwardly (Figs. 2, 5 and 10 to 17), the control port 164 in the auxiliary valve would establish communication between both ports 166 and 167 and port 169 and permit fluid to pass therethrough to operate the spindle piston and engage the spindle clutch. If then the auxiliary valve is left in said position and the main valve V is moved to its corresponding rapid approach position R, as shown in Fig. 10, the supply groove 127 coincides with the port 166, the lower end of which is then also in communication with the control port 164 of the auxiliary valve so that the spindle continues in operation. When, however, the control handle 50 is moved to the return traverse position R₁ (Fig. 12) the supply groove 127 communicates with the port 168, the lower end of which is closed by the auxiliary valve V'. A spring 171, positioned intermediate the end wall of cylinder S' and a collar 172 on the piston rod 110, then acts to return the piston S and open the spindle clutch so as to stop the spindle. Thus the spindle will operate when the main valve is in its feed position irrespective of whether the feed reversing clutch 62 is in its forward or reverse position, and when the main control valve is in a traverse position the spindle will continue to operate only when the traverse is in the same direction as the feed movement determined by the feed reversing clutch.

The manual control handle 50 is mounted on the lower end of a vertically extending shaft 150 rotatably supported in a forwardly extending portion of the bed 1 so that the upper end of the shaft is positioned adjacent the front longitudinal edge of the table 3. The main valve V is arranged to be operated by the handle 50, by means of an arm 151 (Fig. 5) which is formed integrally with the handle 50, and a rod 152, pivotally connected at its forward end to the free end of the arm 151. At its rear end the rod 152 is secured to the lower end of a bar 153, the upper end of which is attached to the valve (Fig. 9). Means is preferably provided for controlling the table movements automatically and, in the preferred form of the invention, a radially extending arm 154 (Fig. 2) is secured to the upper end of the vertical shaft 150, and at its free end carries a roller 155 which is adapted to be engaged by dogs secured to the front edge of the table 3 for the purpose of shifting the main valve V automatically during movement of the table.

The control handle 50 is movable to any one of five different positions, as illustrated in Figs. 5, and 10 to 17. When in its mid-position F₁, as illustrated in Fig. 11, the table 3 will be moved at a feed speed in the direction determined by the feed reversing clutch 62. On each side of the feed position are the rapid traverse positions R, R₁, and beyond the rapid traverse positions are two neutral positions N, N₁. These positions correspond to the different positions of the main valve V and, it will be understood, the trip device arm 154 also has five corresponding positions since the handle 50 and arm 154 are both secured to the vertical shaft 150.

In Figs. 20 and 21 there are illustrated different types of dogs which may be used when it is desired to control the table movements automatically. Some of these dogs are arranged to engage the roller 155 of the trip device to rotate the handle 50 in a clockwise direction, and others are arranged to engage the roller 155 to move the trip device and rotate the handle 50 in a counterclockwise direction. Dogs N₁D, R₁D and F₁D are adapted to rotate the trip device in a clockwise direction, the dog N₁D being arranged to move the trip device into the neutral position N₁, the dog R₁D being arranged to move the trip device into the rapid traverse position R₁, and the dog F₁D being arranged to move the trip device into the feed position F₁. The dogs for moving the trip device in a counterclockwise direction are mounted on the under side of brackets which are secured to the front edge of the table 3 and extend out over the trip device so as to enable the dogs to engage the roller 155 on the side away from the table. Thus a dog F'₁D is arranged to move the trip device into the feed position F₁, a dog RD is arranged to move the trip device into the rapid traverse position R, and a dog ND is arranged to move the trip device into the neutral position N. As illustrated in the drawings, all of the dogs are of the pivoted or latch type so that they are effective to actuate the trip device only in one direction of table movement, but it will be understood that depending upon the particular cycle of operation for which the machine is set up certain of the dogs may be rigid if desired.

The operation of the machine will be described for the three exemplary forms of milling discussed hereinbefore, i. e., "automatic milling", "intermittent milling", and "continuous milling." An automatic milling cycle with the feed toward the right of an operator standing in front of the table (upwardly in Figs. 5 and 10 to 17) is illustrated diagrammatically in Fig. 22. An intermittent milling cycle is illustrated diagrammatically in Fig. 23, when the feed is toward the right. A continuous milling cycle is illustrated diagrammatically in Fig. 24.

Assuming first an automatic milling cycle with the feed toward the right as in Fig. 22 (upwardly in Figs. 10 to 17), the feed reversing clutch lever 51 will be in the position illustrated in Figs. 10 to 13. Starting with the main control handle 50 in the neutral position $N_1$, shown in Fig. 13, this handle is moved manually to the rapid approach position R, as illustrated in Fig. 10, to start the cycle at A (Fig. 22). The spindle clutch piston S then moves to its operative position to start the spindle, and the table 3 moves rapidly to advance to work to the cutter until a feed dog $F_1D$ engages the trip device arm 154 and moves the main valve to the feed position $F_1$, as illustrated in Fig. 11. The table then moves at a feed rate with the spindle continuing in operation until, at the end of the feed portion of the stroke, a rapid return dog $R_1D$ shifts the main valve to the rapid return position $R_1$ as illustrated in Fig. 12. The spindle then stops and the table returns at a rapid rate until a stop dog $N_1D$ shifts the main valve back to the neutral position $N_1$, as illustrated in Fig. 13. Since the operation of the automatic cycle with the feed in the reverse direction would simply be the reverse of that just described, it is believed unnecessary to discuss it in detail. At the commencement of such a reverse cycle the control levers would be as illustrated in Fig. 17, after which the control handle 50 would move to the positions shown in Figs. 14, 15 and 16 for the rapid approach, feed, and rapid return movements of the table respectively.

The intermittent milling cycle illustrated in Fig. 23 is also started manually at A and would differ from the automatic milling cycle of Fig. 22 only in the addition of a rapid approach dog RD and a second feed dog $F_1D$ so that after the first feed movement with the control mechanism as illustrated in Fig. 11, the main valve control handle 50 would be moved back to the rapid approach position R, as illustrated in Fig. 10, by the rapid approach dog RD after which it would again be moved to the feed position $F_1$ illustrated in Fig. 11 prior to the return of the table when the return traverse dog $R_1D$ moves the main valve to the position $R_1$ shown in Fig. 12. It will be noted that in both Figs. 10 and 11 the spindle clutch piston S remains in its clutch engaged position so that the spindle continues in operation during the entire forward movement of the table, irrespective of whether the table is moved at a traverse or fed rate. However, when the table is reversed (Fig. 12) the spindle clutch piston S is shifted to disengage the spindle clutch.

The intermittent milling cycle with the feed in the reverse direction is similar to the cycle just described with the exception that the dogs are reversed and the control mechanism moves through the positions illustrated in Figs. 14 to 17, the auxiliary valve V' being in its other operative position as determined by the feed reversing clutch control lever 51.

In Fig. 24, there is illustrated a continuous milling cycle in which the table is stopped at approximately the middle of its forward as well as return stroke, thus requiring the operator to start each portion of the cycle manually at the points A and A'. This cycle is sometimes desirable to prevent injuries if proper time were not taken for inspecting the new pieces after they are clamped to the table, and is sometimes necessary when it requires considerable time to load a blank piece of work onto the table. This cycle comprises, commencing at the position A, a rapid approach R, feed $F_1$, rapid return $R_1$, and stop at B; (then after manual movement of the control handle 50 back to its rapid return position) rapid return $R_1$, feed $F'_1$, rapid approach R, and stop at B'. Thus with the control mechanism as illustrated in Fig. 13, a manual movement of the control handle 50 to the position illustrated in Fig. 10 would start the table movement and also start the cutter spindle. The table would approach the work at a traverse rate after which the control handle 50 would be moved to its feed position $F_1$, as illustrated in Fig. 11, by a dog $F_1D$ for the cutting portion of the stroke, and thereafter it would be moved to the return traverse position $R_1$, as illustrated in Fig. 12, by a dog $R_1D$ to return the table. Upon reversal of the table movement the spindle clutch piston S would move to its inoperative position as shown in Fig. 12. At the end of the return traverse movement the control handle 50 would be moved back to the neutral position N by a dog ND. To complete the remaining half of the cycle it would then be necessary for the operator not only to move the feed reversing clutch lever 51 to the position illustrated in Figs. 14 to 17, but also to move the control handle 50 to the position $R_1$, illustrated in Fig. 14. Thereafter the control handle 50 would be moved successively to the positions illustrated in Figs. 15, 16 and 17 by dogs $F'_1D$, RD and ND, to complete the second half of the cycle and return the table to the starting position.

If desired a continuous milling cycle, such as illustrated in Fig. 25, might be used, wherein the table instead of being stopped at approximately the middle of its cycle and at an intermediate point in the traverse movements, is stopped at the end of the traverse movements. Furthermore, if it is desired to operate the table without stopping, the dogs may be set up as illustrated in Fig. 26. In this instance, with the control illustrated herein, it is necessary for the operator to shift the feed reversing clutch lever 51 during or at the end of the return traverse movements of the table, although if desired a separate automatic trip device for the feed reversing clutch of any well known form might be provided for reversing the feed clutch automatically. Such a device might, for example, be positioned adjacent the rear edge of the table so that suitable dogs secured to the rear edge of the table would be effective to operate it without interfering with the trip device for the main valve.

In all these cycles, it is evident, the cutter spindle will be in operation not only during the feed movement of the table but also during the rapid approach movement if the feed reversing clutch is already engaged for feeding in the same direction as the traverse clutch. Thus in intermittent milling, the spindle is started at the commencement of the forward stroke and remains in operation during the entire forward stroke of the table and is stopped when the table reverses so as to prevent marring of the work. This is

What is claimed is:

1. A milling machine comprising, in combination, a rotatably mounted spindle, a slidably mounted work support, means for driving said spindle including a spindle clutch, means for reciprocating said support at feed and traverse rates including a feed reversing clutch, a feed disconnecting clutch, and a traverse reversing clutch, a first piston and cylinder device for operating said spindle clutch, a second piston and cylinder device for operating said feed disconnecting clutch, a third piston and cylinder device for actuating said traverse reversing clutch, a unitary valve mechanism for controlling the movements of said clutches by said piston and cylinder devices, said valve mechanism comprising a valve having a rapid approach, feed, rapid return, and neutral positions, a manual control device operable independently of said valve for shifting said feed reversing clutch, and an auxiliary valve device operable by said manual control device for rendering said unitary valve mechanism ineffective to control the operation of said spindle clutch piston.

2. A machine tool comprising, in combination, a rotatably mounted spindle, a slidably mounted support, means for driving said spindle including a spindle clutch, means for reciprocating said support at feed and traverse rates including a feed reversing clutch and a traverse reversing clutch, a first piston and cylinder device for operating said spindle clutch, a second piston and cylinder device for operating said traverse reversing clutch, a unitary valve mechanism for controlling the movements of said clutches by said piston and cylinder devices, a control device operable independently of said valve mechanism for shifting said feed reversing clutch, and an auxiliary valve device operable by said control device for rendering said unitary valve mechanism ineffective to control the operation of said spindle clutch piston.

3. A machine tool comprising, in combination, a rotatably mounted spindle, a slidably mounted support, means for driving said spindle including a spindle clutch, means for reciprocating said support at feed and traverse rates, a piston and cylinder device for operating said spindle clutch, a unitary valve mechanism for controlling the movements of said spindle and support, said valve mechanism comprising a valve having rapid approach, feed, rapid return, and neutral positions, a manual control device operable independently of said valve for altering the effect of said reciprocating means, and an auxiliary valve device operable by said manual control device for rendering said unitary valve mechanism ineffective to control the operation of said spindle clutch piston.

4. A machine tool comprising, in combination, a rotatably mounted spindle, a slidably mounted support, means for driving said spindle including a spindle clutch, means for reciprocating said support at feed and traverse rates, means for operating said spindle clutch, a unitary mechanism for controlling the movements of said spindle and support, said mechanism comprising a member having rapid approach, feed, rapid return, and neutral positions, a manual control device operable independently of said member for altering the effect of said reciprocating means, and an auxiliary control device operable by said manual control device for rendering said unitary mechanism ineffective to control the operation of said spindle clutch.

5. A machine tool comprising, in combination, a rotatably mounted spindle, a slidably mounted support, means for driving said spindle including a spindle clutch, means for reciprocating said support at feed and traverse rates, a piston and cylinder device for operating said spindle clutch, a unitary valve mechanism for controlling the movements of said spindle and support, a manual control device operable independently of said valve for altering the effect of said reciprocating means, and an auxiliary valve device operable by said manual control device for rendering said unitary valve mechanism ineffective to control the operation of said spindle clutch.

6. A milling machine comprising, in combination, a rotatably mounted spindle, a slidably mounted support, means for driving said spindle including a spindle clutch, means for reciprocating said support at feed and traverse rates, a piston and cylinder device for operating said spindle clutch, a unitary valve mechanism for controlling the movements of said spindle and support, said valve mechanism comprising a valve having rapid approach, feed, rapid return, and neutral positions, a manual control device operable independently of said valve for altering the effect of said reciprocating means, and an auxiliary valve device operable by said manual control device for rendering said unitary valve mechanism ineffective to control the operation of said spindle clutch piston.

7. A milling machine having, in combination, a rotary cutter spindle, means for driving and starting and stopping the spindle, a reciprocatory work support, mechanism for actuating the work support including mechanism for moving the support at feed and at traverse rates in both forward and reverse directions, means for controlling said mechanism including trip devices movable with said support, and means operable by said controlling means for starting the spindle when the support is started at a traverse rate in a forward direction and for stopping the spindle when the support is reversed at the end of its movement in a forward direction.

8. A milling machine having, in combination, a rotary cutter spindle, a reciprocatory work support, mechanism for actuating the work support including mechanism for moving the support at feed and at traverse rates in both forward and reverse directions, means for controlling said mechanism including a trip device adjacent said support, means operable by said trip device for starting the spindle when the support is started at a traverse rate in a forward direction and for stopping the spindle when the support is reversed at the end of its movement in said forward direction, and means including dogs movable with said support and arranged to operate said trip device for changing the speed of the support from traverse to feed and back to traverse during movement of the support in one direction without stopping said spindle.

9. A milling machine having, in combination, a rotary cutter spindle, a reciprocating work table, mechanism for moving the table including means for traversing the table in both directions and for feeding the table in both directions, means for controlling the said mechanism so as to move the table through a cycle comprising rapid advance, feed, and rapid return, including a manual control lever operable for starting the rapid advance movement, and means operable by said control lever when the table commences its rapid advance movement in a forward direction to start said cutter spindle and to stop said spindle at the end of said forward movement.

10. A machine tool comprising, in combination, a rotatably mounted tool support, a reciprocatory work support, means for actuating the tool support including means for starting and stopping the support, means for reciprocating the work support comprising feeding means, means for reversing the feeding means, traversing means, and means for reversing the traversing means, control mechanism for said tool actuating and work support reciprocating means comprising a first member operable to control said traverse reversing means, and a second member operable to control both said starting and stopping means and said feed reversing means.

11. A milling machine comprising, in combination, a rotatably mounted cutter spindle, a slidably mounted work support, means for actuating said spindle including a spindle clutch, means for reciprocating said work support at feed and traverse rates comprising a feed reversing clutch and a traverse reversing clutch, a first motor operator for said spindle clutch, a second motor operator for said traverse reversing clutch, a unitary control mechanism for said motor operators comprising a member having rapid approach, feed, and rapid return positions, a second member operable independently of said first member for shifting said feed reversing clutch, and means operable by said second member for rendering said unitary control mechanism ineffective to control the operation of said spindle clutch motor operator when the feed clutch is reversed.

12. A milling machine having, in combination, a rotary cutter spindle, a reciprocatory work support, mechanism for transmitting motion to said support including means for alternately changing the speed of the support from traverse to feed and feed to traverse during its movement in a forward direction, control means operable by dogs on said support during its forward movement for effecting said speed changes and for reversing the support, means for driving the spindle during the forward movement of the support and means exclusively operable by said control means for automatically starting the spindle at the commencement of the forward movement of the support and for maintaining it in operation during the speed changes effected throughout the forward movement of the support.

13. A milling machine having, in combination, a rotary cutter spindle, a reciprocatory work support, mechanism for transmitting motion to said support, control means including a unitary valve mechanism operable by dogs on said support for alternately changing the speed of the support from traverse to feed during its movement in one direction and mechanism controlled by said unitary valve for automatically starting the spindle at the commencement of the movement of the support at traverse speed.

14. A milling machine having, in combination, a rotary cutter spindle, a reciprocating work table, mechanism for reciprocating said table comprising a reversing feed clutch and a reversing traverse clutch, means for controlling the operation of said clutches including a valve and a control device mounted adjacent the forward edge of said table operable manually to start the table in a forward direction and operable by dogs on the table to change the speed, reverse and stop the table, and means operable by said control device through said valve for automatically starting said spindle at the beginning of a rapid advance movement of the table initiated by said control device.

15. A milling machine having, in combination, a rotary cutter spindle, a reciprocatory work support, mechanism for transmitting motion to said support, control means for said mechanism, including a valve device, operable by dogs on said support governing said mechanism to change the speed of the support from traverse to feed and feed to traverse during its movement in one direction, and mechanism operable by said valve device for automatically starting the spindle at the commencement of the movement of the support at traverse speed in the aforesaid direction.

16. A milling machine having, in combination, a rotary cutter spindle, a reciprocating work table, mechanism for reciprocating said table comprising a reversing feed clutch and a reversing traverse clutch, means for controlling the operation of said clutches including a unitary control device mounted adjacent the forward edge of said table and operable manually to start the table in a forward direction and operable by dogs on the table to change the speed, reverse and stop the table and means controlled by said unitary control device for automatically starting said spindle at the beginning of a rapid advance movement of the table initiated by said control device.

PEARL SUNDSTRAND,
*Executrix of the Estate of Gustaf David Sundstrand, Deceased.*